(12) United States Patent
Fischer

(10) Patent No.: US 7,434,039 B2
(45) Date of Patent: Oct. 7, 2008

(54) COMPUTER PROCESSOR CAPABLE OF RESPONDING WITH COMPARABLE EFFICIENCY TO BOTH SOFTWARE-STATE-INDEPENDENT AND STATE-DEPENDENT EVENTS

(75) Inventor: Michael Andrew Fischer, San Antonio, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 229 days.

(21) Appl. No.: 11/470,728

(22) Filed: Sep. 7, 2006

(65) Prior Publication Data

US 2007/0061633 A1    Mar. 15, 2007

Related U.S. Application Data

(60) Provisional application No. 60/723,699, filed on Oct. 5, 2005, provisional application No. 60/723,165, filed on Oct. 3, 2005, provisional application No. 60/716,806, filed on Sep. 13, 2005.

(51) Int. Cl.
*G06F 9/48* (2006.01)

(52) U.S. Cl. .................................. 712/244; 712/228
(58) Field of Classification Search ................. 712/228, 712/244; 710/260–269
See application file for complete search history.

(56) References Cited

U.S. PATENT DOCUMENTS 6,606,704 B1 *   8/2003   Adiletta et al. .............. 712/248
6,880,070 B2 *   4/2005   Gentieu et al. .............. 712/228

* cited by examiner

*Primary Examiner*—William M Treat

(57) ABSTRACT

A technique for enabling a computer processor to be capable of responding with comparable efficiency to both: (i) events whose handling is independent on the state of the software machine that responds to the events, and (ii) events whose handling is dependent on the state of the software machine that responds to the events. Each time a software state machine enters a state, one or more event control registers are programmed to direct the illustrative embodiment where to resume execution when each possible event occurs. This enables the illustrative embodiment to automatically branch to the code that is appropriate for the combination of the event and the state of the software machine.

17 Claims, 9 Drawing Sheets

COMPUTER PROCESSOR CAPABLE OF RESPONDING WITH COMPARABLE EFFICIENCY TO BOTH SOFTWARE-STATE-INDEPENDENT AND STATE-DEPENDENT EVENTS

REFERENCE TO RELATED APPLICATIONS

The following patent applications are incorporated by reference:

i. U.S. patent application Ser. No. 60/716,806, entitled "Multi-Threaded Processor Architecture," filed 13 Sep. 2005, presently expired and from which was filed U.S. Ser. No. 11/470,721 entitled "Multi-Threaded Processor Architecture", Ser. No. 11/470,728 entitled "Computer Processor Capable of Responding with Comparable Efficiency to Both Software-State-Independent and State-Dependent Events," and Ser. No. 11/470,732 entitled "Computer Processor Architecture Comprising Operand Stack and Addressable Registers," all filed on Sep. 7, 2006;

ii. U.S. patent application Ser. No. 60/723,699, entitled "Computer Processor Capable of Responding with Comparable Efficiency to Both Software-State-Independent and State-Dependent Events," filed 5 October 2005, presently expired and from which was filed U.S. Ser. Nos. 11/470,721 entitled "Multi-Threaded Processor Architecture", 11/470,728 entitled "Computer Processor Capable of Responding with Comparable Efficiency to Both Software-State-Independent and State-Dependent Events," and 11/470,732 entitled "Computer Processor Architecture Comprising Operand Stack and Addressable Registers," all filed on Sep. 7, 2006; and iii. U.S. patent application Ser. No. 60/723,165, entitled "Computer Processor Architecture Comprising Operand Stack and Addressable Registers," filed 3 Oct. 2005, presently expired and from which was filed U.S. Ser. Nos. 11/470,721 entitled "Multi-Threaded Processor Architecture", 11/470,728 entitled "Computer Processor Capable of Responding with Comparable Efficiency to Both Software-State-Independent and State-Dependent Events," and 11/470,732 entitled "Computer Processor Architecture Comprising Operand Stack and Addressable Registers," all filed on Sep. 7, 2006.

FIELD OF THE INVENTION

The present invention relates to computer design in general, and, more particularly, to a computer architecture for efficiently responding to events.

BACKGROUND OF THE INVENTION

The overall performance of a computer processor is often limited by the ability of the processor to rapidly and efficiently respond to events. This is particularly true when the events are frequent and diverse in nature and when the handling of some or all of the events is a function of the state of the software machine that responds to the events. Therefore, the need exists for a computer processor that can respond with comparable efficiency to both:

(i) events whose handling is independent on the state of the software machine that responds to the events, and (ii) events whose handling is dependent on the state of the software machine that responds to the events.

SUMMARY OF THE INVENTION

The present invention provides a technique for enabling a computer processor to be capable of responding with comparable efficiency to both:

(i) events whose handling is independent on the state of the software machine that responds to the events, and (ii) events whose handling is dependent on the state of the software machine that responds to the events.

In the prior art, the handling of events whose handling is independent of the state of the software machine that handles the events is usually efficient, generally using a priority interrupt mechanism. In contrast, the handling of events whose handling is dependent on the state of the software machine that handles the events is less efficient because the software machine must ascertain (1) what state the software machine was in and (2) what event occurred, and then must branch to the appropriate code for handling that event when in the present software state.

The software state machines running on the illustrative embodiment do not need to ascertain either of these items. Instead, each time a software state machine enters a state, the processor is programmed so that it knows exactly where to begin execution upon the occurrence of each event that is of interest while in that state. Then when an event occurs, the processor automatically begins execution of the code that is appropriate for the combination of the event and the state of the software machine. To accomplish this, the illustrative embodiment provides three event activation "styles."

The first of these styles is called Activation-In-Place event activation. Activation-In-Place event activation is particularly efficient for handling events whose handling is dependent on the state of the software machine that handles the events and in which the software machine only has one normal—in contrast to exceptional—transition. This transition can lead back to the state in which the event occurred or another state.

The second of these styles is called Activation-In-Place-Plus-Offset event activation. Activation-In-Place-Plus-Offset event activation is particularly efficient for handling events whose handling is dependent on the state of the software machine that handles the events and in which the software machine transits to one of several states. Each of these transitions can lead back to the state in which the event occurred or another state.

The third of these styles is called Vector-Plus-Offset event activation. Vector-Plus-Offset event activation is particularly efficient for handling events whose handling is independent of the state of the software machine that handles the events. These events are typically indications of exceptional or erroneous conditions, requests for alternate processing, or indicators of other abnormal occurrences.

By appropriately assigning activation styles to events, and by storing code in the manner described below, the illustrative embodiment is capable of responding with comparable efficiency to events whose handling is both independent on the state of the software machine that responds to the events and dependent on the state of the software machine.

The illustrative embodiment comprises:

(1) a program counter that stores a first memory address;

(2) a programmable event control register associated with an event; and (3) an activation controller for responding to the event by:

(3.1) storing the sum of the first memory address plus a first offset into the program counter when the programmable event control register is programmed to store the sum of the first memory address plus the first offset into the program counter when the event occurs.

DETAILED DESCRIPTION

Figure 1:
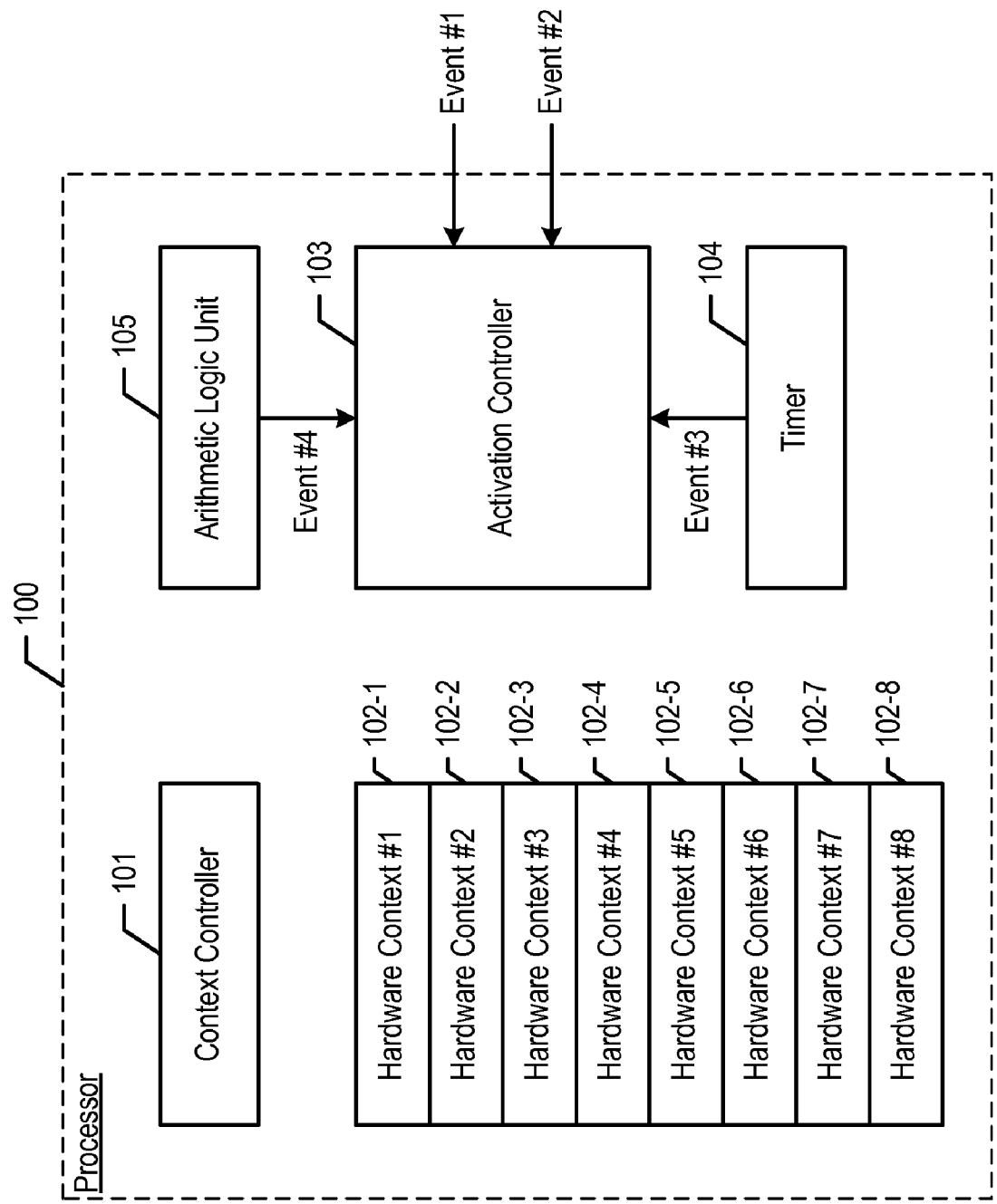
FIG. 1 depicts a block diagram of a the salient components of a processor in accordance with the illustrative embodiment of the present invention.

FIG. 1 depicts a block diagram of the salient components of a processor in accordance with the illustrative embodiment of the present invention. Processor 100 is a multi-threaded processor, which is capable of concurrently executing multiple threads, but it will be clear to those skilled in the art, after reading this disclosure, how to make and use alternative embodiments of the present invention that are not multi-threaded.

In accordance with the illustrative embodiment, thread #1 embodies a software state machine that comprises four states. It will be clear to those skilled in the art, after reading this disclosure, how to make and use alternative embodiments of the present invention in which a thread embodies a software state machine that comprises any number of states.

In accordance with the illustrative embodiment, the software state machine embodied in thread #1 is capable of responding to four "events," designated herein as Event #1, Event #2, Event #3, and Event #4, in each of the four states. For the purposes of this specification, an "event" is defined as a signal, regardless of whether the signal is generated within or without a processor and regardless of whether the signal is generated synchronously or asynchronously.

It will be clear to those skilled in the art, after reading this disclosure, how to make and use alternative embodiments of the present invention that responds to different sets of events in different states. Furthermore, it will be clear to those skilled in the art, after reading this disclosure, how to make and use alternative embodiments of the present invention that are capable of responding to any number of events.

In accordance with the illustrative embodiment, Event #1 is a state-machine reset command, which is generated outside of processor 100; Event #2 is an physical-carrier-lost event, which is generated outside of processor 100; Event #3 is a timer time-out that is generated within processor 100, and Event #4 is an arithmetic overflow event that is generated within processor 100. It will be clear to those skilled in the art, after reading this disclosure, how to make and use alternative embodiments of the present invention that respond to any type of event (e.g., hardware and software resets, interrupts, arithmetic logic unit overflow and underflow conditions, traps, timer time-outs, external and internal signal conditions, etc.).

Processor 100 comprises: context controller 101, eight hardware contexts 102-1 through 102-8, activation controller 103, timer 104, arithmetic logic unit 105, two internal event inputs, and two external event inputs. Processor 100 also comprises other components (e.g., an instruction decoder, general registers, a central data path, etc.), but those are all well known in the prior art and are omitted from FIG. 1 and the detailed description so that the disclosure can focus on the inventive aspects of processor 100.

Context controller 101 is logic that is responsible for allocating access among hardware contexts 102-1 through 102-8 to the resources of processor 100 (e.g., the central data path, arithmetic logic unit 105, etc.). It will be clear to those skilled in the art how to make and use context controller 101. Furthermore, U.S. patent application 60/716,806, entitled "Multi-Threaded Processor Architecture," teaches a context controller that is suitable for use with the illustrative embodiment.

Each of hardware contexts 102-1 through 102-8 comprises the hardware required to store the current state of a thread in a form that enables processor 100 to switch to or from the execution of the thread. The salient details of each of hardware contexts 102-1 through 102-8 are described below and with respect to FIG. 2.

Activation controller 103 is logic that responds to the occurrence of an event in accordance with the direction given to it by currently executing hardware context, as is described in detail below and with respect to FIGS. 3 through 6.

Timer 104 is a hardware timer that can be set by processor 100 and that issues an event, Event #3, when it times out. It will be clear to those skilled in the art how to make and use timer 104. Furthermore, it will be clear to those skilled in the art, after reading this disclosure, how to make and use alternative embodiments of the present invention that comprise any number of timers and that issue any number of signals.

Arithmetic logic unit 105 is logic that performs arithmetic and logical functions and that issues Event #4 when an arithmetic overflow occurs within it. It will be clear to those skilled in the art how to make and use arithmetic logic unit 105.

Figure 2:
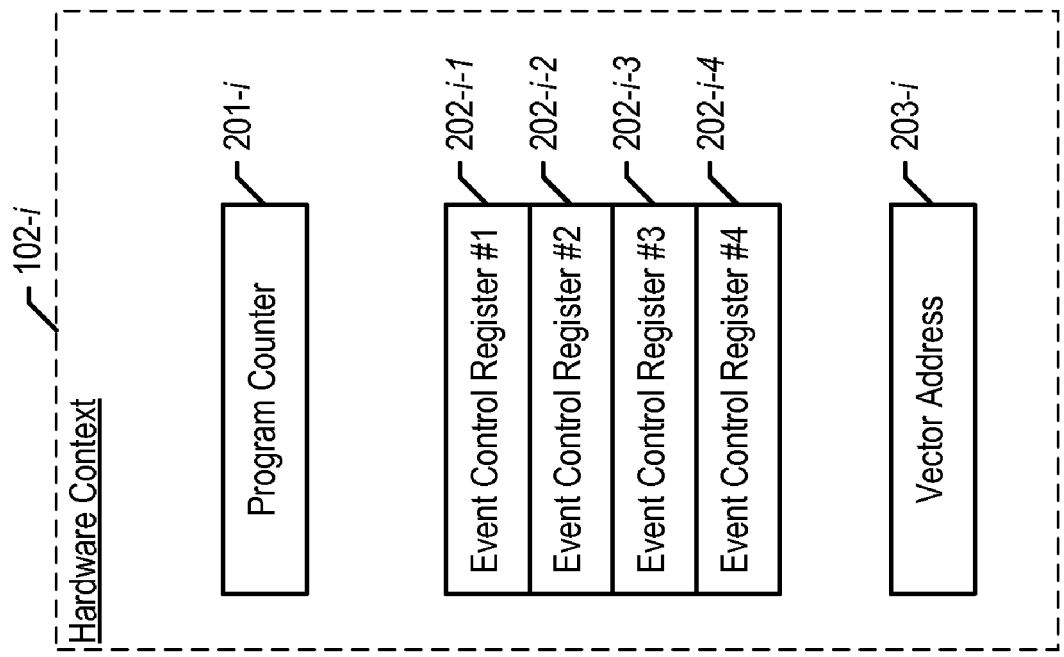
FIG. 2 depicts a block diagram of the salient components of hardware context 102-$i$, wherein i$\in$\{1, 2, 3, 4, 5, 6, 7, 8\}, in accordance with the illustrative embodiment.

FIG. 2 depicts a block diagram of the salient components of hardware context 102-$i$, wherein i$\in$\{1, 2, 3, 4, 5, 6, 7, 8\}, in accordance with the illustrative embodiment. Hardware context 102-$i$ comprises program counter 201-$i$, event control registers 202-$i$-1 through 202-$i$-4, and vector address register 203-$i$. Hardware context 102-$i$ also comprises other components, but those are all well known in the prior art and are omitted from FIG. 2 and the detailed description so that the disclosure can focus on the inventive aspects of processor 100.

Program counter 201-$i$ is a register that stores the memory address of the next instruction to be executed by hardware context 102-$i$. When an event occurs, event hander 103 can either:

(1) leave the address in program counter 201-$i$ undisturbed, or (2) store a new address into program counter 201-$i$ in the manner described below and with respect to FIGS. 3 through 6.

Vector address register 203-$i$ is a register that stores a memory address, which, in some cases, is used in the manner described below and with respect to FIG. 5 to generate the new address stored in program counter 201-$i$.

Each of event control registers 202-$i$-1 through 202-$i$-4 are associated with an event and direct how activation controller 103 is to respond to the occurrence of that event. In particular, event control register 202-$i$-1 is associated with Event #1, event control register 202-$i$-2 is associated with Event #2, event control register 202-$i$-3 is associated with Event #3, and event control register 202-$i$-4 is associated with Event #4.

Each of event control registers 202-$i$-1 through 202-$i$-4 are programmable, and each can be programmed to hold one of four values that direct activation controller 103 how to respond to an event. The four values and their meaning are summarized in Table 1.

TABLE 1

Event Control Register Values and Their Handing

| Event Control Register Value | Activation Style |
| --- | --- |
| 1 | Activation-In-Place |
| 2 | Activation-In-Place-Plus-Offset |
| 3 | Vector Plus Offset |
| 4 | Disable |

Figure 3:
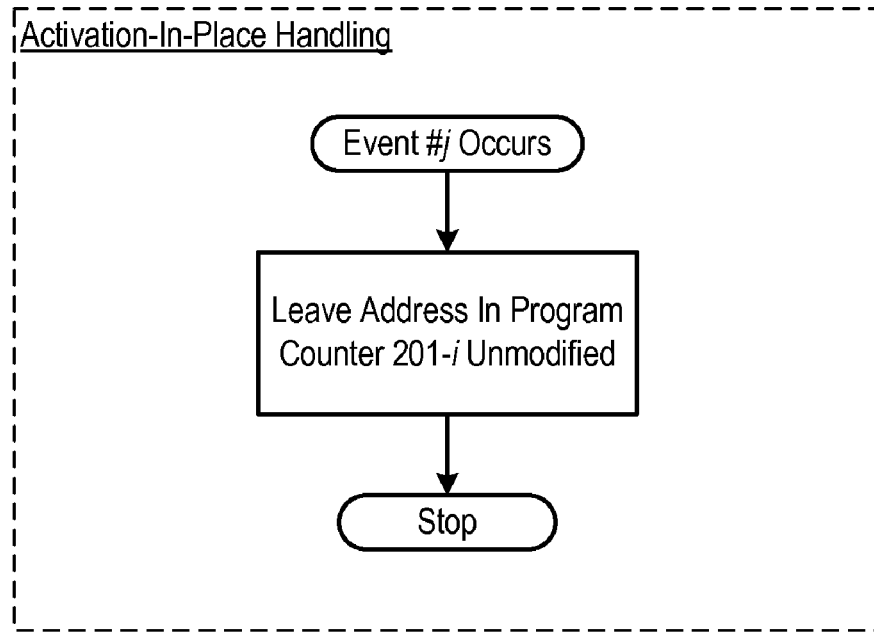
FIG. 3 depicts a flowchart of how event hander 103 responds by leaving the address in program counter 201-$i$ unmodified when event control register 201-$i$-$j$, wherein j$\in$\{1, 2, 3, 4\}, is programmed with value 1 and Event #j occurs.

Activation-In-Place—When event control register 201-$i$-$j$, wherein $j\in\{1, 2, 3, 4\}$, is programmed with value 1 and Event #j occurs, event hander 103 responds by leaving the address in program counter 201-$i$ unmodified, as depicted in FIG. 3, and the thread resumes execution at the instruction following the instruction when thread entered the state. Activation-In-Place event activation is particularly efficient for handling events whose handling is dependent on the state of the software machine that handles the events and in which the software machine only has one normal—in contrast to exceptional—transition. This transition can lead back to the state in which the event occurred or to another state.

Figure 4:
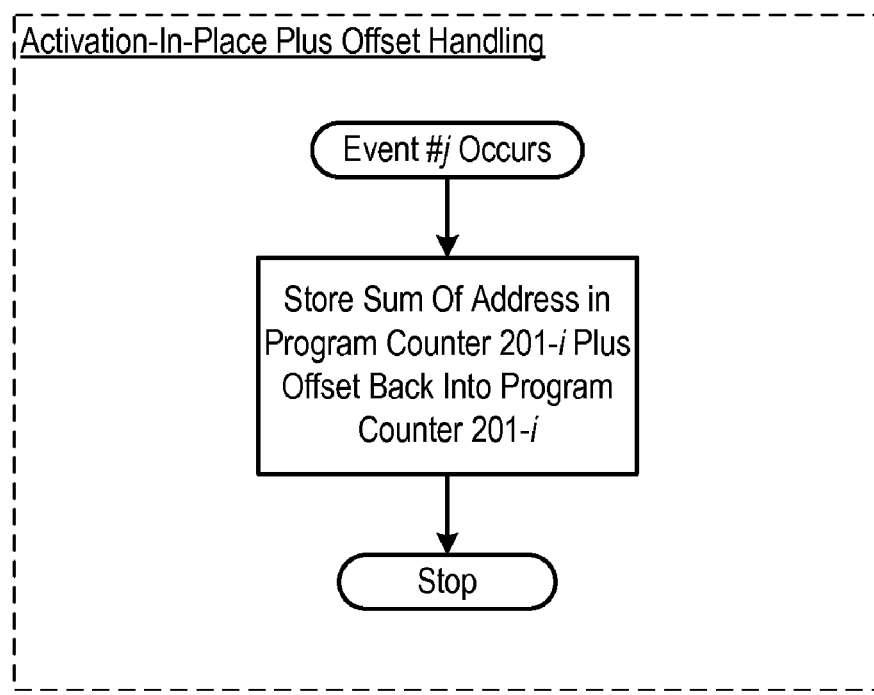
FIG. 4 depicts a flowchart of how event hander 103 responds by storing the sum of the address in program counter 201-$i$ plus an offset back into program counter 201-$i$, when event control register 201-$i$-$j$ is programmed with value 2 and Event #j occurs.

Activation-In-Place-Plus-Offset—When event control register 201-$i$-$j$ is programmed with value 2 and Event #j occurs, event hander 103 responds by storing the sum of the address in program counter 201-$i$ plus an offset back into program counter 201-$i$, as depicted in FIG. 4. In accordance with the illustrative embodiment, the value stored into program counter 201-$i$, $pc_{new}$, is equal to:

$$pc_{new}=pc_{old}+p\cdot(j-1) \qquad (Eq. 1)$$

wherein $pc_{old}$ is the current value of program counter 201-$i$ and $p$ is a positive integer. In accordance with the illustrative embodiment, p=8, but it will be clear to those skilled in the art, after reading this disclosure, how to make and use alternative embodiments of the present invention in which p has any value. Activation-In-Place-Plus-Offset event activation is particularly efficient for handling events whose handling is dependent on the state of the software machine that handles the events and in which the software machine transits to one of several states. Each of these transitions can lead back to the state in which the event occurred or to another state. From this definition, it will be clear to those skilled in the art, after reading this disclosure, that the effect of the Activation-In-Place event activation style is the same as that for the Activation-In-Place-Plus-Offset event activation style for Event #1.

Figure 5:
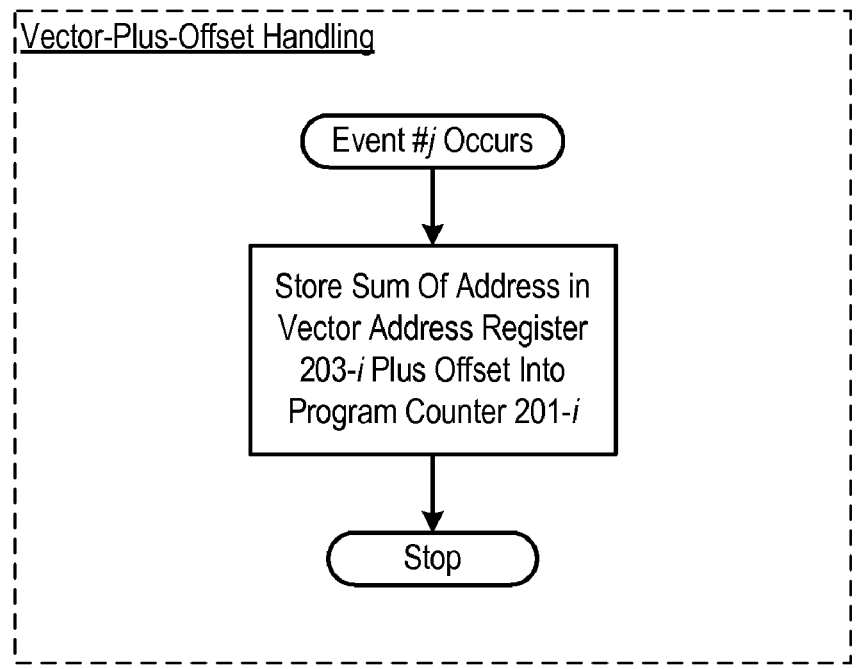
FIG. 5 depicts a flowchart of how event hander 103 responds by storing the sum of the address in vector address register 203-$i$ plus an offset into program counter 201-$i$, when event control register 201-$i$-$j$ is programmed with value 3 and Event #j occurs.

Vector-Plus-Offset—When event control register 201-$i$-$j$ is programmed with value 3 and Event #j occurs, event hander 103 responds by storing the sum of the address in vector address register 203-$i$ plus an offset into program counter 201-$i$, as depicted in FIG. 5. In accordance with the illustrative embodiment, the value stored into program counter 201-$i$, $pc_{new}$, is equal to:

$$pc_{new}=v+p\cdot(j-1) \qquad (Eq. 2)$$

wherein v is the value of vector address 203-$i$ and $p$ is a positive integer. In accordance with the illustrative embodiment, v=8, but it will be clear to those skilled in the art, after reading this disclosure, how to make and use alternative embodiments of the present invention in which v has any value. Vector-Plus-Offset event activation is particularly efficient for handling events whose handling is independent on the state of the software machine that handles the events.

Figure 6:
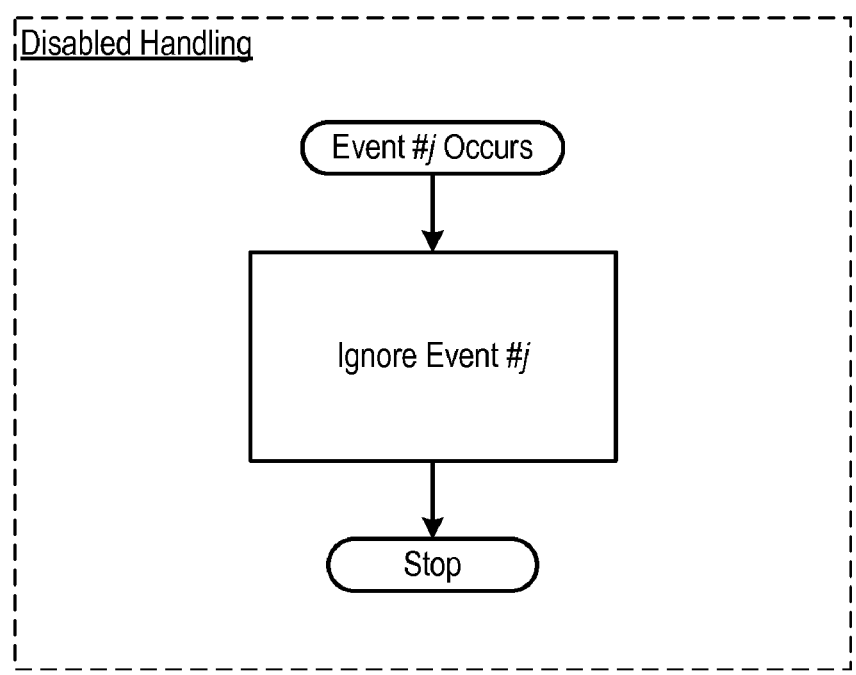
FIG. 6 depicts a flowchart of how event hander 103 responds by ignoring the event, when event control register 201-$i$-$j$ is programmed with value 4 and Event #j occurs.

Disabled—When event control register 201-$i$-$j$ is programmed with value 4 and Event #j occurs, event hander 103 responds by ignoring the event, as depicted in FIG. 6. The ability to ignore an event is advantageous because it enables the masking of events that are not relevant to a particular state.

The variety of event activation styles offered by the illustrative embodiment facilitates the efficient execution of software for implementing state machines that respond to events. To make these advantages clear, the design of a sample program that will run on the illustrative embodiment and that will implement an illustrative software state machine will be shown. The illustrative state machine is depicted in FIG. 7 and exists in one thread, thread "1." It will be clear to those skilled in the art, after reading this disclosure, how to make and use programs that implement any state machine and that run on any embodiment of the present invention.

Figure 7:
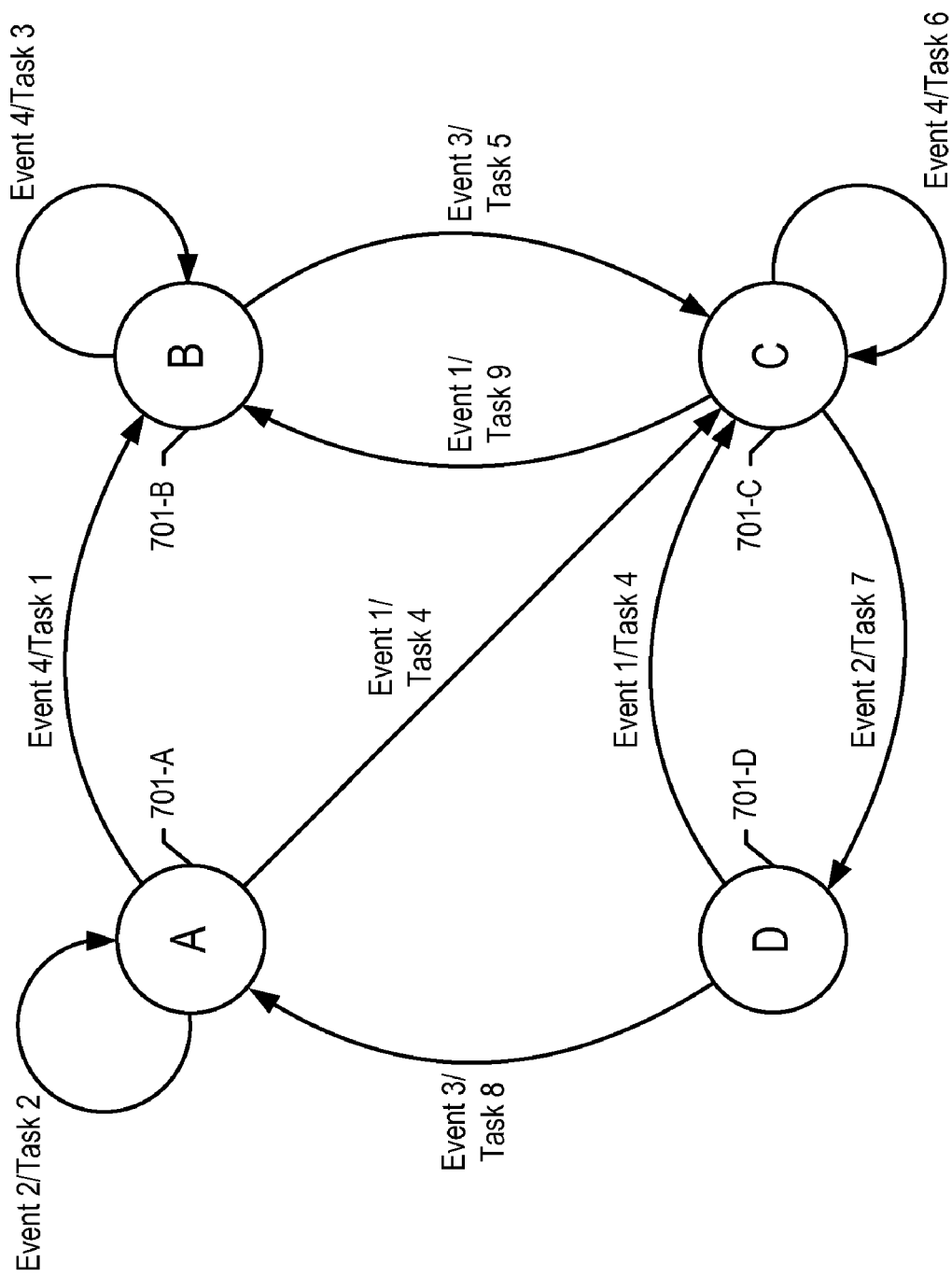
FIG. 7 depicts an illustrative state machine.

The state-transition diagram depicted in FIG. 7 comprises 4 states 701-A, 701-B, 701-C, and 701-D and responds to four events, Event #1, Event #2, Event #3, and Event #4. The occurrence of each event triggers the execution of a task.

In State 701-A, Event #1 requires the execution of Task 4 and a transition to State 701-C; Event #2 requires the execution of Task 2 and the return to State 701-A; Event #3 is ignored, and Event #4 requires the execution of Task 1 and a transition to State 701-B.

In State 701-B, Event #1 and Event #2 are ignored; Event #3 requires the execution of task 5 and a transition to State 701-C, and Event #4 requires the execution of Task 3 and the return to State 701-B.

In State 701-C, Event #1 requires the execution of Task 9 and a transition to State 701-B; Event #2 requires the execution of Task 7 and a transition to State 701-D; Event #3 is ignored, and Event #4 requires the execution of Task 6 and a return to State 701-C.

In State 701-D, Event #1 requires the execution of Task 4 and a transition to State 701-C; Event #2 is ignored; Event #3 requires the execution of Task 8 and a transition to State 701-A, and Event #4 is ignored.

In accordance with the illustrative embodiment, the execution of some tasks are accompanied by a transition to a successor state that is independent of the previous state (e.g., the execution of Task 4 in response to Event 1 in transitions from both of states 701-A and 701-D). In contrast, the execution of some tasks are accompanied by a transition to a successor state that is dependent on the previous state. In accordance with the illustrative embodiment, the software for implementing the state machine should use the Vector-Plus-Offset event activation style for handling the events that trigger the execution of tasks that are accompanied by a transition to a successor state that is independent on the previous state. In contrast, the software should use the Activation-In-Place and Activation-In-Place-Plus-Offset event activation styles for handing the events that trigger the execution of tasks that are accompanied by a transition to a successor state that is dependent on the previous state.

Furthermore, the software should, when possible, use the Activation-In-Place event activation style for handling an event that triggers the execution of a task that leads to a successor state that is the same as the previous state (i.e., a self loop). This is advantageous because it increases instruction locality, which can increase the performance of a processor that performs instruction pre-fetching or that uses an instruction cache.

In accordance with the illustrative embodiment, the events that trigger the execution of tasks that are accompanied by a transition to a successor state that is independent of the previous state are assigned to the lowest event numbers because this convention typically reduces the amount of memory needed to store the Vector-Plus-Offset code and Activation-In-Place-Plus-Offset code.

To this end, when the state machine is in State 701-A, event control register 202-1-1 (for handling Event #1) is programmed to designate Vector-Plus-Offset event activation; event control register 202-1-2 (for handling Event #2) is programmed to designate Activation-In-Place event activation; event control register 202-1-3 (for handling Event #3) is programmed to be Disabled, and event control register 202-1-4 (for handling Event #4) is programmed to designate Activation-In-Place-Plus-Offset event activation. This is summarized in Table 2.

TABLE 2

Event Control Registers in State 701-A

| State | Event Control Register 202-1-1 | Event Control Register 202-1-2 | Event Control Register 202-1-3 | Event Control Register 202-1-4 |
|---|---|---|---|---|
| 701-A | Vector-Plus-Offset | Activation-In-Place | Disabled | Activation-In-Place-Plus-Offset |

When the state machine is in State 701-B; event control register 202-1-1 (for handling Event #1) is programmed to be Disabled; event control register 202-1-2 (for handling Event #2) is programmed to be Disabled event activation; event control register 202-1-3 (for handling Event #3) is programmed to designate Activation-In-Place-Plus-Offset event activation, and event control register 202-1-4 (for handling Event #4) is programmed to designate Activation-In-Place event activation. This is summarized in Table 3.

TABLE 3

Event Control Registers in State 701-B

| State | Event Control Register 202-1-1 | Event Control Register 202-1-2 | Event Control Register 202-1-3 | Event Control Register 202-1-4 |
|---|---|---|---|---|
| 701-A | Disabled | Disabled | Activation-In-Place-Plus-Offset | Activation-In-Place |

When the state machine is in State 701-C; event control register 202-1-1 (for handling Event #1) is programmed to designate Activation-In-Place-Plus-Offset event activation; event control register 202-1-2 (for handling Event #2) is programmed to designate Activation-In-Place-Plus-Offset event activation; event control register 202-1-3 (for handling Event #3) is programmed to be Disabled, and event control register 202-1-4 (for handling Event #4) is programmed to designate Activation-In-Place-Plus-Offset event activation. This is summarized in Table 4.

TABLE 4

Event Control Registers in State 701-C

| State | Event Control Register 202-1-1 | Event Control Register 202-1-2 | Event Control Register 202-1-3 | Event Control Register 202-1-4 |
|---|---|---|---|---|
| 701-A | Activation-In-Place-Plus-Offset | Activation-In-Place-Plus-Offset | Disabled | Activation-In-Place-Plus-Offset |

When the state machine is in State 701-D, event control register 202-1-1 (for handling Event #1) is programmed to designate Vector-Plus-Offset event activation; event control register 202-1-2 (for handling Event #2) is programmed to be Disabled; event control register 202-1-3 (for handling Event #3) is programmed to designate Activation-In-Place event activation, and event control register 202-1-4 (for handling Event #4) is programmed to be Disabled. This is summarized in Table 5.

TABLE 5

Event Control Registers in State 701-D

| State | Event Control Register 202-1-1 | Event Control Register 202-1-2 | Event Control Register 202-1-3 | Event Control Register 202-1-4 |
|---|---|---|---|---|
| 701-A | Vector-Plus-Offset | Disabled | Activation-In-Place | Disabled |

Figure 8:
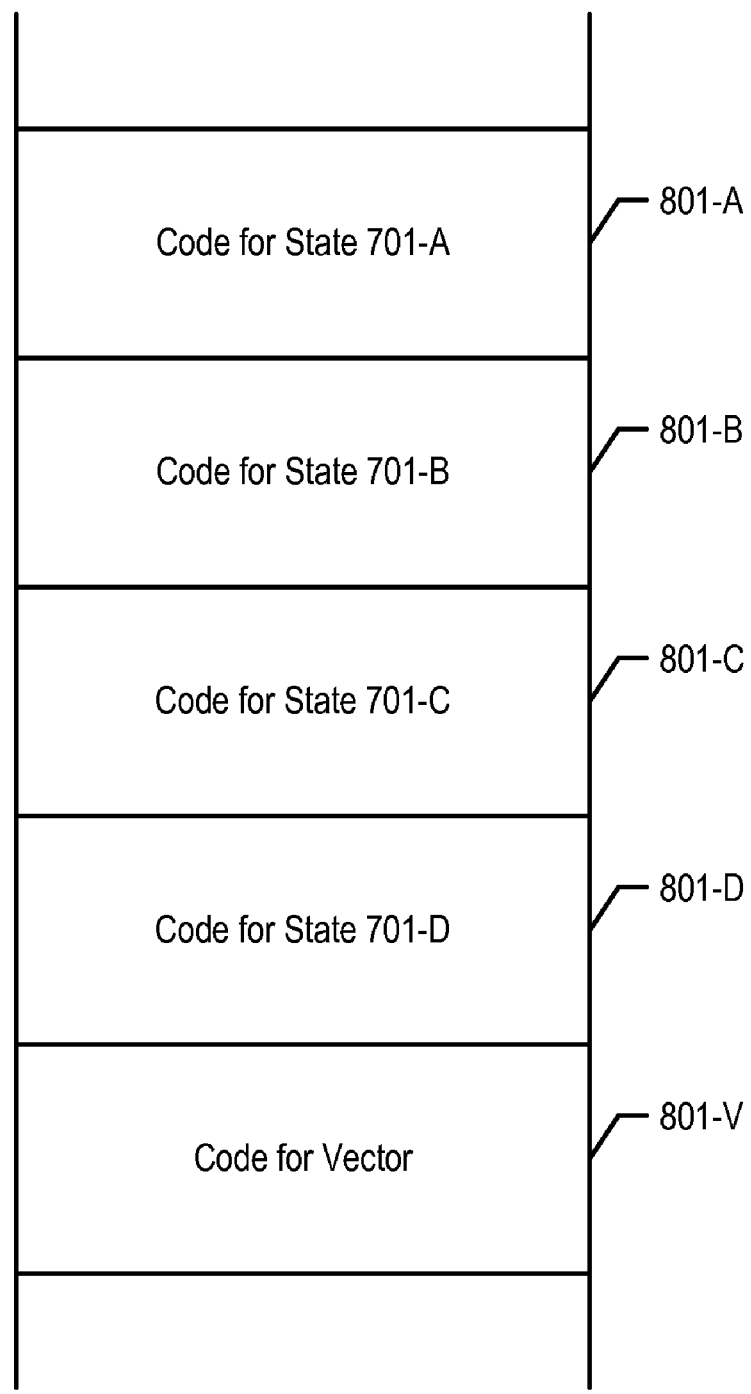
FIG. 8 depicts a portion of program memory that store the program that implements the software state machine depicted in FIG. 7.

FIG. 8 depicts a portion of program memory that store the program that implements the software state machine depicted in FIG. 7. The assignment of event activation styles to events dictates where in program memory the code for handling the various events is stored. For example, the code for Tasks 1 and 2 are in memory segment 801-A, the code for Tasks 3 and 5 are in memory segment 801-B, the code for Tasks 6, 7, and 9 are in memory segment 801-C, the code for Task 8 is in memory segment 801-D, and the code for Task 4 is in memory segment 801-V.

Figure 9:
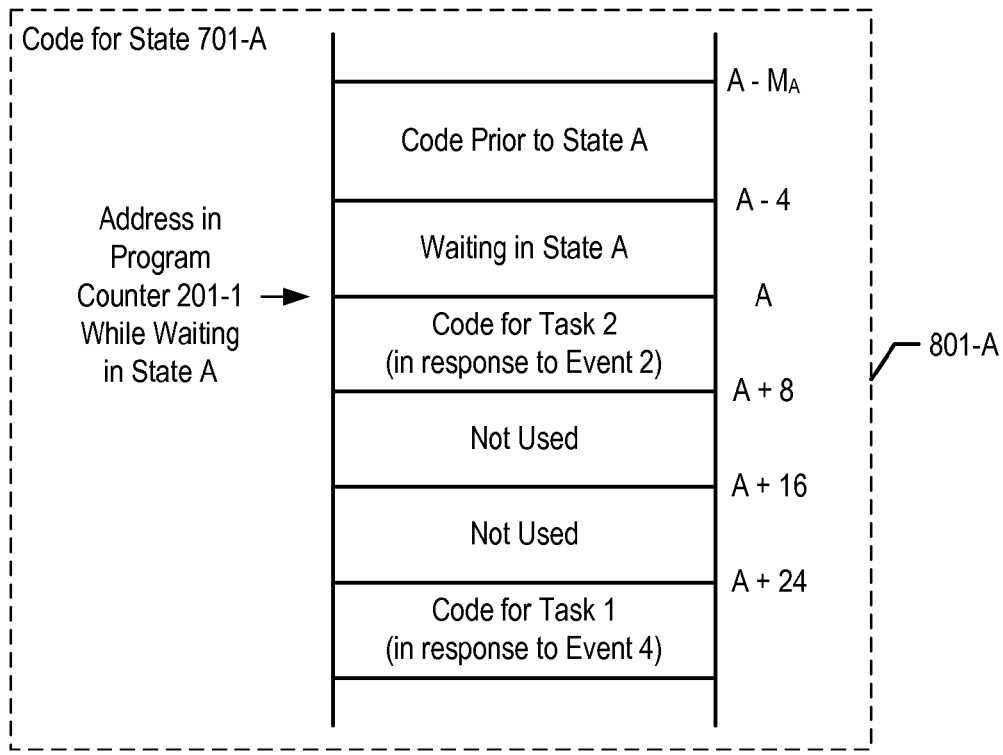
FIG. 9 depicts the salient aspects of memory segment 801-A in accordance with the illustrative embodiment.

FIG. 9 depicts the salient aspects of memory segment 801-A in accordance with the illustrative embodiment. The code for executing Task 2 begins at memory address A and concludes with an unconditional jump instruction back to address A-$M_A$, wherein $M_A$ is a positive integer. The code for executing Task 1 begins at memory address A+24 and concludes with an unconditional jump instruction to address B-$M_B$, wherein $M_B$ is a positive integer. Note that because the memory between addresses A+8 and A+24 are not used for Activation-In-Place-Plus-Offset event activation in State 701-A, the code for executing Task 2 can spill over into that unused memory.

Figure 10:
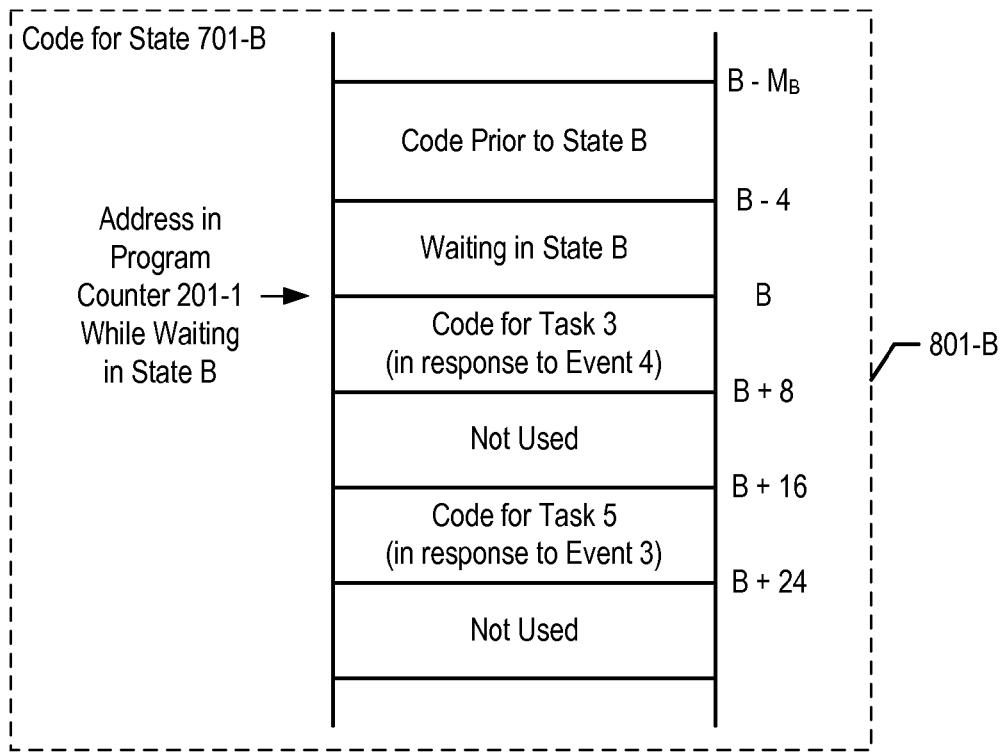
FIG. 10 depicts the salient aspects of memory segment 801-B in accordance with the illustrative embodiment.

FIG. 10 depicts the salient aspects of memory segment 801-B in accordance with the illustrative embodiment. The code for executing Task 3 begins at memory address B and concludes with an unconditional jump instruction back to address B-$M_B$. The code for executing Task 5 begins at memory address B+16 and concludes with an unconditional jump instruction to address C-$M_C$, wherein $M_C$ is a positive integer. Note that because the memory between addresses B+8 and B+16 are not used for Activation-In-Place-Plus-Offset event activation in State 701-B, the code for executing Task 3 can spill over into that unused memory. Furthermore, the memory after address B+24 is not used for Activation-In-Place-Plus-Offset event activation in State 701-B, the code for executing Task 5 can spill over into that unused memory or other code can begin there.

Figure 11:
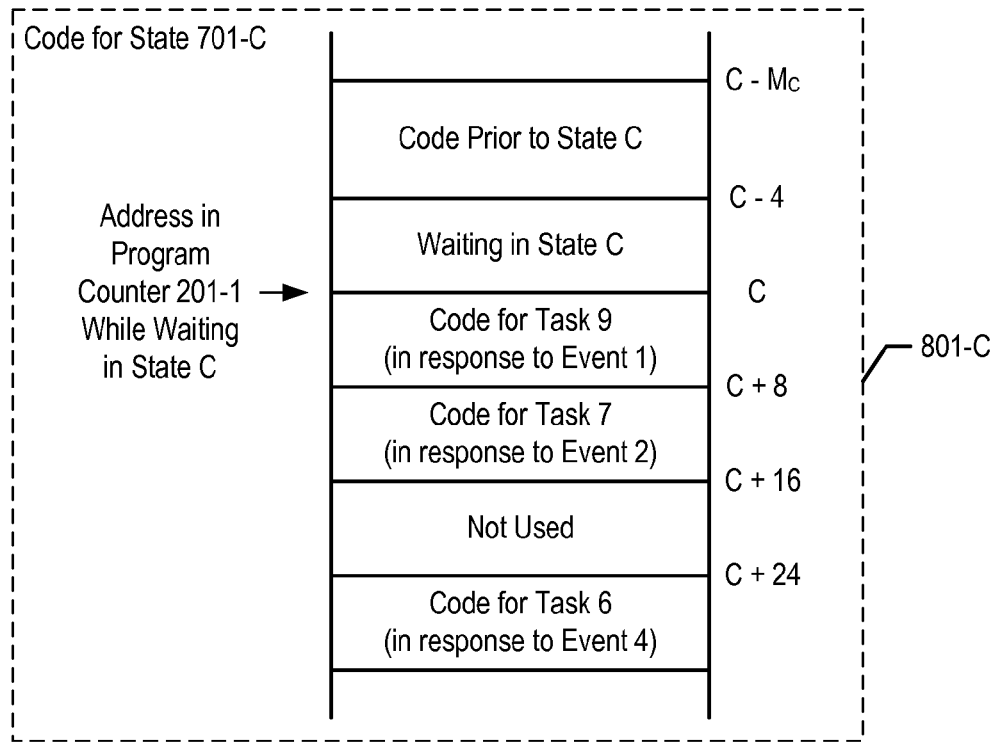
FIG. 11 depicts the salient aspects of memory segment 801-C in accordance with the illustrative embodiment.

FIG. 11 depicts the salient aspects of memory segment 801-C in accordance with the illustrative embodiment. The code for executing Task 9 begins at memory address C and concludes with an unconditional jump instruction to address B-$M_B$. The code for executing Task 6 begins at memory address C+24 and concludes with an unconditional jump instruction back to address C-$M_C$. The code for executing Task 7 begins at memory address C+8 and concludes with an unconditional jump instruction to address D-$M_D$. Note that because the memory between addresses C+16 and C+24 are not used for Activation-In-Place-Plus-Offset event activation in State 701-C, the code for executing Task 7 can spill over into that unused memory.

Figure 12:
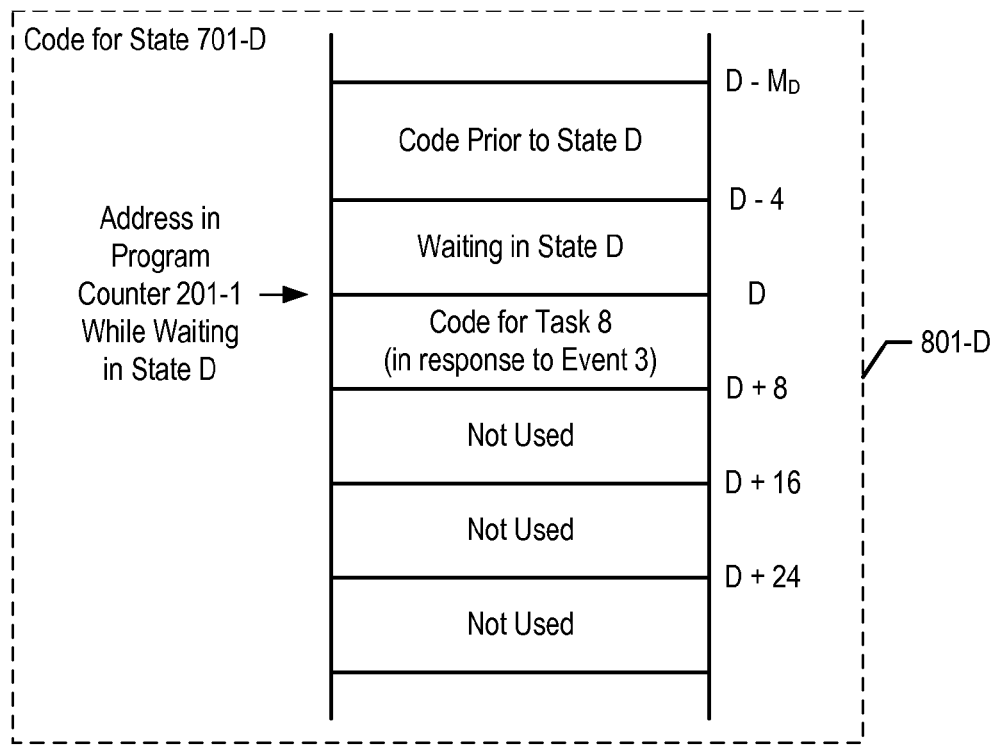
FIG. 12 depicts the salient aspects of memory segment 801-D in accordance with the illustrative embodiment.

FIG. 12 depicts the salient aspects of memory segment 801-D in accordance with the illustrative embodiment. The code for executing Task 8 begins at memory address D and concludes with an unconditional jump instruction to address A-$M_A$. The code for event 3 can begin at memory address D because Event 3 uses Activation-In-Place event activation, whereas if Event 3 had used Activation-In-Place-Plus-Offset event activation this code would have needed to begin at D+16, leaving D through D+15 unused with nothing that could spill over. Because Event 1 uses Vector-Plus-Offset event activation, there is no ambiguity due to Event 3 starting at D because nothing else is enabled to start at D, thereby leaving everything beyond D+8 for other use. Note that because the memory between addresses D+8 and D+32 are not used for Activation-In-Place-Plus-Offset event activation in State 701-D, the code for executing Task 8 can spill over into that unused memory or other code can begin there.

Figure 13:
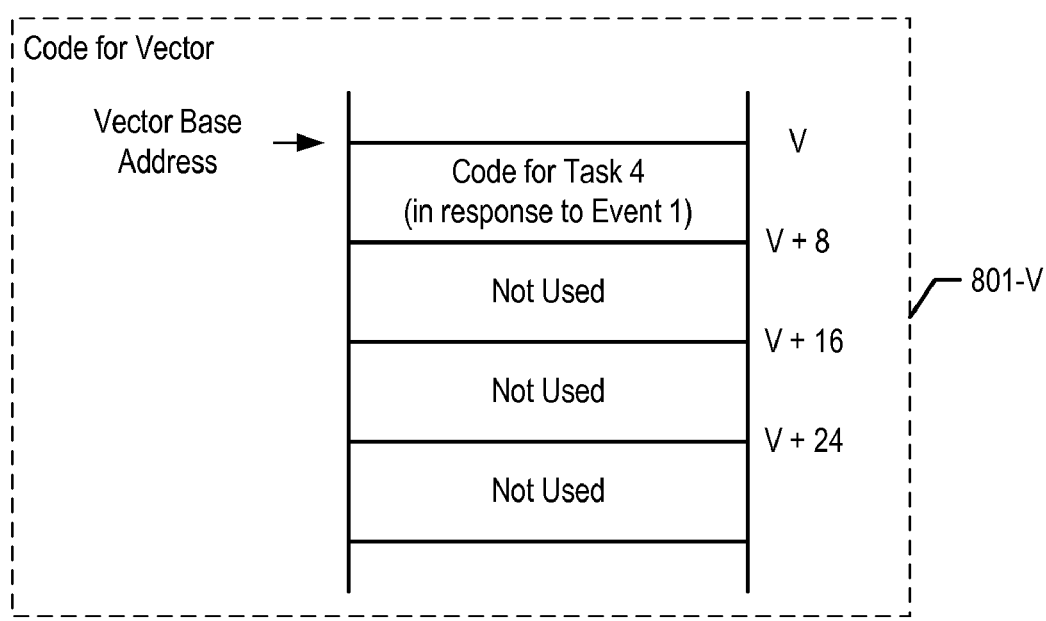
FIG. 13 depicts the salient aspects of memory segment 801-V in accordance with the illustrative embodiment.

FIG. 13 depicts the salient aspects of memory segment 801-V in accordance with the illustrative embodiment. The code for executing Task 4 begins at memory address V and concludes with an unconditional jump instruction to address C-$M_C$. Note that because the memory between addresses V+8 and V+32 are not used for Vector-Plus-Offset event activation, the code for executing Task 4 can spill over into that unused memory or other code can begin there.

This use of the event activation styles offered by the illustrative embodiment facilitates a design of the software for implementing the software state machine in FIG. 7 that facilitates a rapid response to events. It will be clear to those skilled in the art, after reading this disclosure, how to make and use programs that implement any state machine and that run on any embodiment of the present invention.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A processor comprising:
   an activation controller;
   a pluralilty of hardware contexts, each of the hardware contexts associated with a predetermined first event and a predetermined second event and comprising:
   (1) a program counter that stores a first memory address;
   (2) a first programmable event control register associated with a first event, the first programmable event control register programmed to designate that a first sum of the first memory address and a first offset is to be stored in the program counter when said first event occurs;
   (3) a second programmable event control register associated with a second event, the second programmable event control register programmed to designate that a second sum of the first memory address and a second offset is to be stored in the program counter when said second event occurs; and
   (4) the activation controller for responding to said first event and said second event by:
      (4.1) respectively storing the first sum and the second sum into said program counter when said first event and said second event occurs.

2. The processor of claim 1 wherein said activation controller is also for (4.2) ignoring said first event when said programmable event control register is programmed to ignore said first event.

3. A processor comprising:
   an activation controller;
   a context controller for controlling the processor between multiple hardware contexts; and
   a plurality of hardware contexts, each of the plurality of hardware contexts comprising:
   (1) a program counter that stores a first memory address and a second memory address;
   (2) a first programmable event control register associated with a first event and a second programmable event control register associated with a second event; and
   (3) the activation controller responding to said event by:
      (3.1) leaving said first memory address unmodified when said programmable event control register is programmed to leave said first memory address unmodified when said first event occurs,
      (3.2) storing a first sum of a second memory address plus a first offset into said program counter when said first programmable event control register is programmed to store a sum of the first memory address plus said first offset when said first event occurs, and
      (3.3) storing the second sum into said program counter when said second programmable event control register is programmed to store the second sum when said second event occurs.

4. The processor of claim 3 wherein said activation controller is also for storing a sum of said first memory address plus a third offset into said program counter when said first programmable event control register is programmed to store the sum of said first memory address plus said third offset into said program counter when said first event occurs.

5. The processor of claim 3 wherein said activation controller is also for (3.4) ignoring said first event when said first programmable event control register is programmed to ignore said first event.

6. A processor comprising:
   a context controller for controlling the processor between multiple hardware contexts;
   an activation controller; and
   a plurality of hardware contexts, each of the plurality of hardware contexts comprising:
   (1) a program counter that stores a first memory address;
   (2) a first programmable event control register associated with a first event; and
   (3) a second programmable event control register associated with a second event,
   (4) the activation controller responding to said first event and said second event by:
      (4.1) storing the sum of said first memory address plus a first offset into said program counter when said first programmable event control register is programmed to store the sum of said first memory address plus said first offset into said program counter when said first event occurs, and
      (4.2) storing the sum of said first memory address plus a second offset into said program counter when said second programmable event control register is programmed to store the sum of said first memory address plus said second offset into said program counter when second event occurs.

7. The processor of claim 6 wherein said first offset is an integral multiple of an integer and said second offset is an integral multiple of said integer.

8. The processor of claim 6 wherein said activation controller is also for:
   (4.3) storing a second memory address into said program counter when said first programmable event control register is programmed to store said second memory address into said program counter when said first event occurs, and
   (4.4) storing a third memory address into said program counter when said second programmable event control register is programmed to store said third memory address into said program counter when said second event occurs.

9. The processor of claim 6 wherein said activation controller is also for:
   (4.3) storing the sum of a second memory address plus a third offset into said program counter when said first programmable event control register is programmed to store the sum of said second memory address plus said third offset into said program counter when said first event occurs, and
   (4.4) storing the sum of said second memory address plus a fourth offset into said program counter when said second programmable event control register is programmed to store the sum of said second memory address plus said fourth offset into said program counter when said second event occurs.

10. The processor of claim 9 wherein said third offset is an integral multiple of an integer and said fourth offset is an integral multiple of said integer.

11. The processor of claim 9 wherein said activation controller is also for:
    (4.3) leaving said first memory address unmodified when said first programmable event control register is programmed to leave said first memory address unmodified when said first event occurs, and
    (4.4) leaving said second memory address unmodified when said second programmable event control register is programmed to leave said second memory address unmodified when said second event occurs.

12. The processor of claim 6 wherein said activation controller is also for:
    (4.3) ignoring said first event when said first programmable event control register designates that said first event is to be ignored, and
    (4.4) ignoring said second event when said second programmable event control register designates that said second event is to be ignored.

13. A multi-threaded processor comprising:
    (1) a context controller;
    (2) an activation controller; and
    (3) a plurality of hardware contexts, wherein each of said hardware contexts comprises:
       (3.1) a program counter that stores a first memory address.
       (3.2) a first programmable event control register associated with a first event, wherein said first programmable event control register can be programmed to designate:
          (3.2.1) that said first memory address is to be left unmodified when said first event occurs
          (3.2.2) that the sum of a second memory address plus a first offset is to be stored in said program counter when said first event occurs; and
       (3.3) a second programmable event control register associated with a second event, wherein said second programmable event control register can be programmed to designate:
          (3.3.1) that said first memory address is to be left unmodified when said second event occurs
          (3.3.2) that the sum of a second memory address plus a second offset is to be stored in said program counter when said second event occurs.

14. The processor of claim 13 wherein said first offset is an integral multiple of an integer and said second offset is an integral multiple of said integer.

15. The processor of claim 13 wherein said first programmable event control register can also be programmed to designate:
    (3.2.3) that the sum of said first memory address plus a first offset is to be stored in said program counter when said first event occurs, and
    wherein said second programmable event control register can also be programmed to designate:
    (3.3.3) that the sum of said first memory address plus a first offset is to be stored in said program counter when said first event occurs.

16. The processor of claim 15 wherein said third offset is an integral multiple of an integer and said fourth offset is an integral multiple of said integer.

17. The processor of claim 13 wherein said first programmable event control register can also be programmed to designate:
    (3.2.3) that said first event is to be ignored, and
    wherein said second programmable event control register can also be programmed to designate:
    (3.3.3) that said second event is to be ignored.

* * * * *